Patented Apr. 8, 1947

UNITED STATES PATENT OFFICE 2,418,688

2,418,688

METHOD OF MAKING AN ELASTIC POLYMER BY MILLING AND HEATING GLYCOL WITH A COPOLYMER OF AN ALKYL ACRYLATE AND MALEIC ANHYDRIDE

Francis Clarke Atwood, Newton, Mass., assignor, by mesne assignments, to National Dairy Products Corporation, New York, N. Y., a corporation of Delaware No Drawing. Application August 11, 1942, Serial No. 454,431

1 Claim. (Cl. 260—75)

This invention relates to elastic polymers. More particularly, the invention relates to copolymers in which the primary polymerizing monomer is an alkyl acrylate, and which are formed so that at an intermediate stage of their manufacture, they have plastic flow properties suiting them for molding, following which the plastic flow characteristic may be eliminated and the elastic characteristics enhanced.

In order to better appreciate and understand the invention, it is desirable to restate the simple rubber chemistry. Natural rubber is thought to consist of long chain molecules which contain unsaturated or double bonds. Rubber in its natural form possesses a certain amount of plastic flow properties, as well as elasticity. These plastic flow properties can be enhanced by milling the crude rubber. The ability of this material to flow has been explained on the basis of the long chain molecules slipping past one another. The molecular structure of natural or milled rubber is not such as to cause the chains to return to their original positions relative to each other. This makes it possible to mold the rubber and make it take any desired form. However, during the milling process it is the practice to mill in sulfur which does not react during the milling conditions, but after or during molding and upon heating to a reactive condition, the sulfur reacts with the unsaturated bonds in the long chain molecules of the rubber to effect cross linkages between the chains. These cross linkages prevent slippage of the chains past each other and eliminate plastic flow. At the same time the elasticity is preserved or enhanced. The latter may be regarded as due to the elastic characteristic of the chains themselves and to the cross links.

The techniques in the rubber industry have been well developed and standardized because of these known properties of natural rubber and its simple reaction with sulfur. Thus it is the standard practice in the rubber industry to process the rubber through an intermediate stage in which it possesses plastic flow to permit molding, following which the plastic flow properties are eliminated by reaction with sulfur in the process known as vulcanization.

In producing an elastic composition, a so-called "synthetic rubber," which may or may not be the same as natural rubber chemically, it is very desirable that such a product be capable of passing through this two stage process so as to permit molding while the product has plastic flow characteristics, following which the plastic flow is eliminated. This is desirable in order that the composition may be processed by the well established rubber technique and by workmen already skilled in that technique.

It is an object of the invention to produce materials which, while quite different chemically from natural and vulcanized rubber, are adapted to be processed in accordance with established rubber processing technique, and which upon completion of processing, have, among other things, a number of properties similar to those of vulcanized natural rubber.

It has been known heretofore that compounds containing ethylene linkages, such as ethylene, acrylic acid, and the alkyl acrylates, may be polymerized into long chain polymers. These polymers possess some elasticity, but all of them possess plastic flow properties. The elasticity, particularly in the case of the alkyl acrylates may be attributed to the alkyl radical extending as side groups from the long chain polymers. However, these side groups do not prevent plastic flow.

It is important to note that these polymers which contain plastic flow properties, and which properties may be enhanced by a milling operation similar to that performed on natural rubber, are all saturated. Thus the long chain molecules of the polymers do not contain any unsaturated or double bonds, and it is not possible to cross link the chains of the polymers by a reaction with sulfur, as is common in the rubber industry.

In accordance with my invention, rather than an attempt to introduce double bonds into the long chain polymers to permit a conventional vulcanizing reaction with sulfur, it has been discovered that it is possible to co-polymerize ethylenic compounds with an anhydride of such a nature and under such conditions that the anhydride group is left intact in the long chain molecules following the polymerization. It is therefore possible to cross link these chains of the polymer by means of esterification in which the anhydride group is reacted with a compound having groups at its ends reactive with an anhydride. In general, the anhydride preferred is the anhydride of an unsaturated acid, such as maleic anhydride, glutaconic anhydride, itaconic anhydride, citraconic anhydride, or homologues thereof such as di-methyl citraconic anhydride and di-methyl maleic anhydride. The above named compounds are all anhydrides of unsaturated dibasic acids. The compound for cross linking the long chain polymers is a polybasic alcohol or amine, such as the glycols, or glycerol, the aliphatic, aromatic or heterocyclic di- or tri-amines, di- or triethanolamine.

In accordance with a preferred embodiment of my invention described merely as illustrative, an alkyl acrylate, preferably a lower alkyl acrylate, such as methyl acrylate or a mixture thereof with a proportion of the ethyl, propyl or butyl acrylates, is co-polymerized with maleic anhydride. The technique of polymerizing the acrylates is well understood in the art and need not be described in detail here. This same technique is applicable to the formation of a co-polymer of the type here contemplated. If it is desired, however, a preferred form of co-polymerization using an excess of the monomers may be utilized.

The alkyl acrylate monomers, when polymerized in accordance with the prior art, result in simple polymers having long chains, a section of which may be illustrated by the following formula:

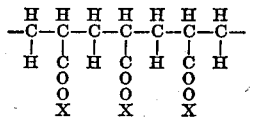

in which X is the alkyl group.

When the alkyl acrylate monomer is co-polymerized with maleic anhydride, a section of the chain of the co-polymer may be viewed as having the following formula:

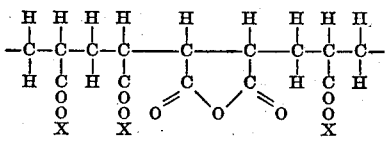

The co-polymer of the alkyl acrylate and the maleic anhydride is elastic. The explanation for this property is of no significance, but this may be attributed to the side groups extending from the long chain molecules. The polymer may be milled on conventional rubber milling rolls to sheet form and this condition has a plastic flow characteristic suiting it to be milled in accordance with the conventional rubber technique. During the milling, pigments, modifiers, catalysts or other material, may be included.

During the milling operation it is also preferred to introduce the compound which will effect the cross linkage. If ethylene glycol is used for this purpose, it is milled in with the co-polymer, and under these conditions no reaction takes place as long as the temperature is not permitted to rise unduly. The milled co-polymer and the linking compound in this form exist as a mere mixture and are capable of being molded in accordance with the conventional rubber technique. Following or during the molding operation the mass is heated, whereupon the ethylene glycol reacts with the anhydride groups in a process of esterification. As a result the chains probably may be viewed as cross linked in the following manner:

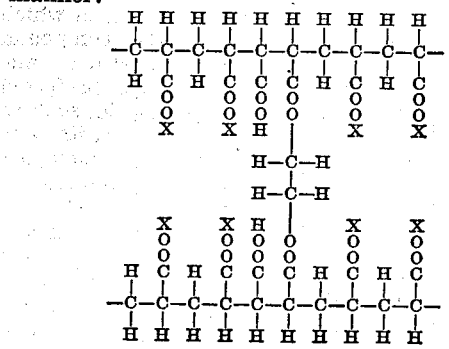

The use of anhydrides of unsaturated acids in the manner described is particularly advantageous in forming co-polymers since such anhydrides polymerize symmetrically with the acrylates and at random depending upon the relative concentration. Thus the anhydride groups are positioned more or less evenly along the chain at points spaced a distance apart in relation to the relative concentrations of the acrylate and anhydride. This result may be attributed to the fact that the anhydride does not polymerize with itself under the conditions of co-polymerization. This is to be distinguished from co-polymers in which both monomers polymerize with themselves as well as with each other.

The relative proportions of the acrylate and the anhydride may be varied over wide ranges, depending upon the conditions of elasticity, strength, etc. desired in the final product. In general, it has been found that 2 to 25% of the anhydride by weight may be co-polymerized with a complementary percentage of the acrylate monomer. Maleic anhydride in the amount of 5% produced a particularly satisfactory product.

The amount of the polybasic cross-linking compound should preferably be related to the amount of the anhydride. Theoretically, for each two moles of the anhydride in the co-polymer, one mole of the cross-linking compound should be required. In practice, this amount may be increased somewhat to assure adequate cross-linkages in the esterification reaction.

The properties of the final product may be controlled to some extent by both the amount of the anhydride compound and cross-linking compound. Thus if a large amount of the anhydride is co-polymerized and such an amount is completely cross-linked, a harder product would result approaching the properties of hard rubber. Even though a large amount of the anhydride is present in the co-polymer, it may be possible to produce a softer and more elastic product by using a smaller amount of the cross-linking compound. This control of the final properties of the composition by varying the amount of the cross-linking compound as well as the amount of the anhydride makes it possible to select an optimum amount of the anhydride for co-polymerization to form a stock material, and to make finished products having different properties, depending upon the amount of cross-linking compounds milled in with the stock material.

After the product has been milled, it may be molded by any of the conventional molding techniques now applicable to the rubber industry. During or following the molding the composition is heated, whereupon the co-polymer and cross-linking compound react to accomplish the esterification. The temperature for this reaction may be anywhere from 100° to 200° C. The temperature in the range of 125° to 140° C. has been found particularly satisfactory.

While the invention has been described particularly with reference to the use of maleic anhydride and ethylene glycol, it will be understood that any other unsaturated anhydrides may be used, such as those mentioned heretofore. Similarly any cross-linking compound containing two groups reactive with the anhydride, such as hydroxyl or amine groups, may be used. In selecting the cross-linking compounds consideration should be given, of course, to the reactivity thereof with the anhydride, and the cross-linking compound also should be selected with reference to the temperatures at which the various operations are preferred to be carried out.

The selection of the cross-linking compounds, particularly the length of the molecule between the reactive groups at the ends thereof provide a further opportunity for obtaining modifications in the final properties of the product. Thus cross-linking compounds of higher molecular weight will result in the long chain polymers being further separated from each other and this in turn may be expected to introduce variations in strength and elasticity.

The invention has been described more particularly in a way which adapts it for utilization in accordance with the technique now conventional in the rubber industry. This is not essential however. For example, the co-polymer in admixture with the cross-linking compound may be placed in solution and applied to textiles for finishing the same, following which the textile material may be heated to accomplish the esterification. Alternatively the co-polymer may be applied to textiles and the coated textile material treated with cross-linking compounds and the esterification accomplished. Various techniques known in the resin industry and the coating industry will suggest themselves as suitable for utilizing the invention to advantage.

It will be obvious that many materials and procedures may be possible in accordance with the invention described herein other than the specific illustrative examples and all of the same that fall within the following claim are intended to be included.

I claim:

The method of making an elastic substance having properties similar to those of vulcanized natural rubber, which comprises, milling the co-polymer of 95 parts of methyl acrylate and 5 parts of maleic anhydride and admixing therewith during the milling about ½ mole of ethylene glycol for each mole of maleic anhydride, molding the product and heating the same to a temperature of about 130° C., the amount of said ethylene glycol admixed with the polymer during milling and the extent of the heating at said temperature being such as to eliminate plastic flow characteristics from the composition and to provide the above mentioned elastic properties.

FRANCIS CLARKE ATWOOD.

REFERENCES CITED

The following references are of record in the file of this patent:

UNITED STATES PATENTS

| Number | Name | Date |
| --- | --- | --- |
| 2,308,581 | Barnes | Jan. 19, 1943 |
| 2,056,794 | Macht | Oct. 6, 1936 |
| 1,121,134 | Rohm | Dec. 15, 1914 |
| 2,047,398 | Voss | July 14, 1936 |
| 2,169,250 | Izard | Aug. 15, 1939 |
| 2,324,739 | Stoops | July 20, 1943 |
| 2,255,313 | Ellis | Sept. 9, 1941 |

FOREIGN PATENTS

| Number | Country | Date |
| --- | --- | --- |
| 488,997 | British | July 15, 1938 |

OTHER REFERENCES

Neher, Industrial & Engineering Chem., Mar. 1936, pp. 267, 269, and 270.

Garvey et al., Ind. & Eng. Chem., Aug. 1941, p. 1060–1064.